Jan. 13, 1925.
A. J. CHARLTON
DEMOUNTABLE RIM
Filed Jan. 4, 1924
1,522,806
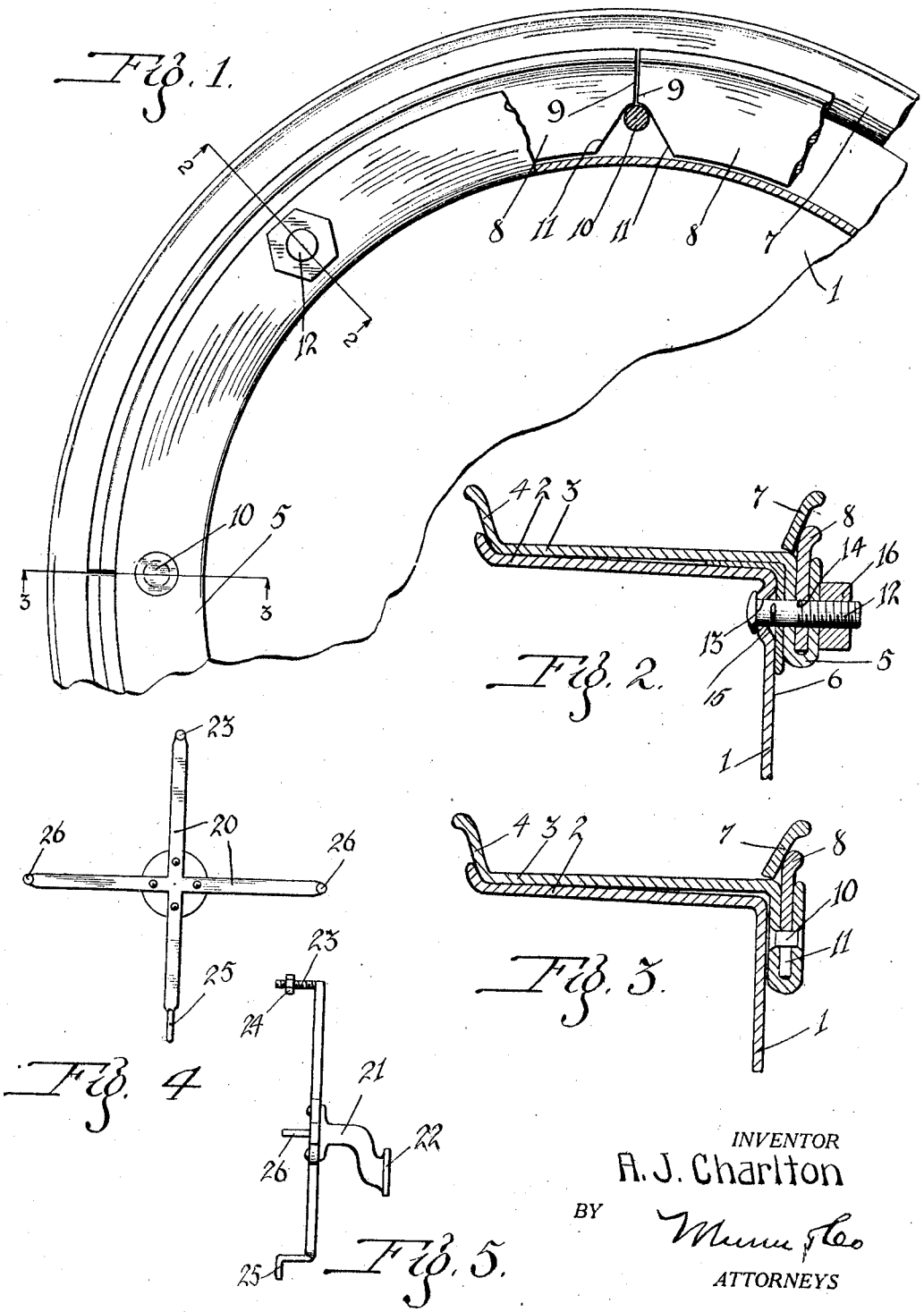
INVENTOR
A. J. Charlton
BY
ATTORNEYS Patented Jan. 13, 1925.

1,522,806

UNITED STATES PATENT OFFICE.

ALBERT JOHN CHARLTON, OF LOWDEN, IOWA.

DEMOUNTABLE RIM.

Application filed January 4, 1924. Serial No. 684,387.

*To all whom it may concern:*

Be it known that I, ALBERT JOHN CHARLTON, a citizen of the United States, and a resident of Lowden, in the county of Cedar and State of Iowa, have invented a new and useful Improvement in Demountable Rims, of which the following is a full, clear, and exact description.

My invention relates to improvements in Demountable Rims for Motor Vehicles, and it consists in the combinations, constructions, and arrangements herein described and claimed.

While I have shown and described a means for securing the demountable rim to a wheel of a motor vehicle, this construction, combination, and arrangement of parts is claimed in a separate application for patent on demountable rim, 731,172, filed August 9, 1924.

An object of my invention is to provide a demountable rim of the type described having relatively few parts and which may be actuated to release or receive a pneumatic tire with a minimum amount of labor.

A further object of my invention is to provide a device of the type described in which the bolts for securing the cooperating parts of the rim to one another are securely fixed to the wheel adjacent the rim so that they may not become lost through carelessness of one actuating the demountable rim.

A further object of my invention is to provide a rim of the type described which is extremely durable, and which is positive in action, there being no parts capable of yielding to permit the unintentional release of the tire casing.

A further object of my invention is to provide a device of the type described which may be manufactured with little expense and which is thoroughly practical for the purpose intended.

Other objects and advantages will appear in the following specification, and the novel features of the invention will be particularly pointed out in the appended claims.

My invention is illustrated in the accompanying drawings forming part of this application, in which—

Figure 1 is a side elevation of a portion of a wheel equipped with my improved demountable rim, Figure 2 is a sectional view along the line 2—2 of Figure 1, Figure 3 is a section along the line 3—3 of Figure 1, Figure 4 is a front elevation of a tire carrier for supporting my demountable rim, and Figure 5 is a side elevation of the mechanism illustrated in Figure 4.

In carrying out my invention, I make use of a vehicle wheel. In Figure 1 I have shown the ordinary type of disc wheel 1 having a flange 2, (see Figure 2) at the outer peripheral edge thereof for the purpose of supporting a tire carrying rim of the demountable type.

The tire carrying rim consists in a rim member 3 having an outwardly extending side wall 4 at one edge thereof, and a deeply depressed portion 5 at the opposite edge. The rim 3 is of a single piece of metal, annular in contour and arranged to seat upon the portion 2 of the wheel 1. The depressed portion 5 of the rim 3 occupies that portion of the rim immediately beyond the outer side wall 6 of the wheel 1, and therefore extends toward the hub of the wheel.

A single side wall for cooperation with the side wall 4 of the rim 3 is provided in a removable flange 7 having substantially the same contour as the side wall 4 of the rim. Means for holding this flange 7 in place upon the rim 3 is provided in a plurality of segments 8 disposed partially within the depressed portion 5 and seated at their adjacent ends 9 upon reenforcing rivets 10 disposed transversely through the walls of the depressed portion 5 of the rim 3 (see Figure 3). The adjacent ends 9 of the segmental members 8 are inclined at 11 so as to form a seat for these members upon the rivets 10.

Means for securely locking the segmental members 8 in position within the depressed portion 5 of the rim is provided in a plurality of bolts 12 projected through a slightly depressed portion 13 in the side wall 6 of the wheel 1 and arranged to project through openings 14 provided in the segmental members 8 and through openings in the adjacent portion of the sides of the depressed portion 5. Cotter pins 15 are projected through the bolts 12 on the outer side of the wall 6 of the wheel 1 so as to prevent dislodgement of the bolt 12 from the wheel, the threaded nuts 16 being provided for the bolts 12 for the purpose of securely binding the segmental locking members 8 between the adjacent parts of the depressed portion 5, and therefore upon the removable flange 3.

The outermost edges of the side walls 4 and 7 as well as the outermost edges of the segmental locking members 8 are beaded so as to reenforce the members at these points.

From the foregoing description of the various parts of the device, the operation thereof may be readily understood. In securing a pneumatic tire casing upon my improved rim, it is first necessary to remove the nuts 16 from engagement with the bolts 12, and to withdraw the rim 3, together with the segmental locking members and the side wall or flange member 7 from the wheel 1. This will of course cause the bolts 12 to lie free of engagement with the openings 14 of the segmental locking members 8, and these members 8 may be moved outwardly and away from the rim 3, whereupon the side wall or removable flange member 7 may be withdrawn from engagement with the rim 3 and the tire casing placed upon the rim.

The side wall or flange member 7 is then moved into engagement with the adjacent side of the tire casing, the segmental members 8 are moved to the position shown in Figures 1 and 2, and the entire rim 3, together with the members 7 and 8, is moved to its original position upon the wheel 1. Care should be taken in having the openings 14 in registration with the bolts 12 on the wheel.

It is then merely necessary to place and tighten the nut 16, whereupon the wheel is ready for use.

In Figures 4 and 5 I have shown a device for the purpose of supporting the rim 13 when not in place upon the wheel 1. This device is of special construction and is necessary to support my improved demountable rim in such a manner as to prevent the unintentional disengagement of the various parts of the rim from one another, which might occur if the rim were supported upon the ordinary type of rim supporting device. This device consists of four radially extending arms 20 supported upon a bracket 21 which is secured by means of a binding plate 22 to the rear portion of the motor vehicle of which the wheels 1 form a part. The upwardly extending arm 20 has a bolt portion 23 with a nut 24 thereupon which is arranged to take the place of one of the bolts 12 in supporting the rim upon the carrier. The downwardly extending arm 20 has a hook member 25 at the lowermost end thereof for the purpose of holding the side wall or rim member 7 against dislodgement from its associate parts, while the arms 20 extending to each side are provided with bolt portions 26 somewhat similar to the bolt 23 for the purpose of passing through that portion of the rim normally occupied by the bolts 12 when the rim is upon the wheel 1.

I claim:

1. A demountable rim of the type described comprising an annular rim having an outwardly extending side wall at one side thereof and an inwardly extending recess at the opposite side, a removable flange forming a side wall of the rim and arranged for disposition upon the rim adjacent to the recess therein, and a plurality of segmental locking members disposed in said recess in said rim, and arranged to overlie a portion of the removable flange for preventing dislodgement of said removable flange from said tire supporting rim when said locking members are in said recess.

2. A demountable rim of the type described comprising an annular rim having an outwardly extending side wall at one side thereof and an inwardly extending recess at the opposite side, a removable flange forming a side wall of the rim and arranged for disposition upon the rim adjacent to the recess therein, and a plurality of segmental locking members disposed in said recess in said rim, and arranged to overlie a portion of the removable flange for preventing dislodgement of said removable flange from said tire supporting rim when said locking members are in said recess, and means for binding said segmental locking members in close engagement with the walls of said recess, whereby said segmental locking members may not move out of engagement with said recess.

3. A demountable rim of the type described comprising an annular rim having an outwardly extending side wall at one side thereof and an inwardly extending recess at the opposite side, a removable flange forming a side wall of the rim and arranged for disposition upon the rim adjacent to the recess therein, and a plurality of segmental locking members disposed in said recess in said rim, and arranged to overlie a portion of the removable flange for preventing dislodgement of said removable flange from said tire supporting rim when said locking members are in said recess, a plurality of transversely disposed supporting members arranged to bridge the recess in said rim and to support the adjacent ends of said segmental locking members, and means for securing said segmental locking members against dislodgment from said recess, said means comprising a plurality of bolts projected through the recessed portion of said rim and through the segmental locking members.

4. A demountable rim of the type described comprising an annular rim having an outwardly extending side wall at one side, a removable flange forming a side wall of said rim and arranged for disposition upon the rim at that side opposite to said outwardly extending side wall, a plurality of segmental locking members arranged to engage with said rim adjacent to said flange and to contact with said flange, when in place, said rim being fashioned to engage with said segmental locking members to prevent the lateral movement of said locking members, and means for locking said segmental locking members against movement relative to said rim, said means comprising bolts projected through portions of said rim and through openings provided in said segmental locking members, whereby the adjacent portions of said rim may be drawn into close contact with said segmental locking members, and movement of said members relative to said rim precluded.

ALBERT JOHN CHARLTON.